April 15, 1958  E. F. CHISENA  2,830,366
CUTTING IMPLEMENTS FOR ELECTRIC CABLES
Filed Aug. 11, 1955  3 Sheets-Sheet 1

INVENTOR
ERNEST F. CHISENA.
BY
William F. Nickel
ATTORNEY

April 15, 1958 E. F. CHISENA 2,830,366
CUTTING IMPLEMENTS FOR ELECTRIC CABLES
Filed Aug. 11, 1955 3 Sheets-Sheet 2
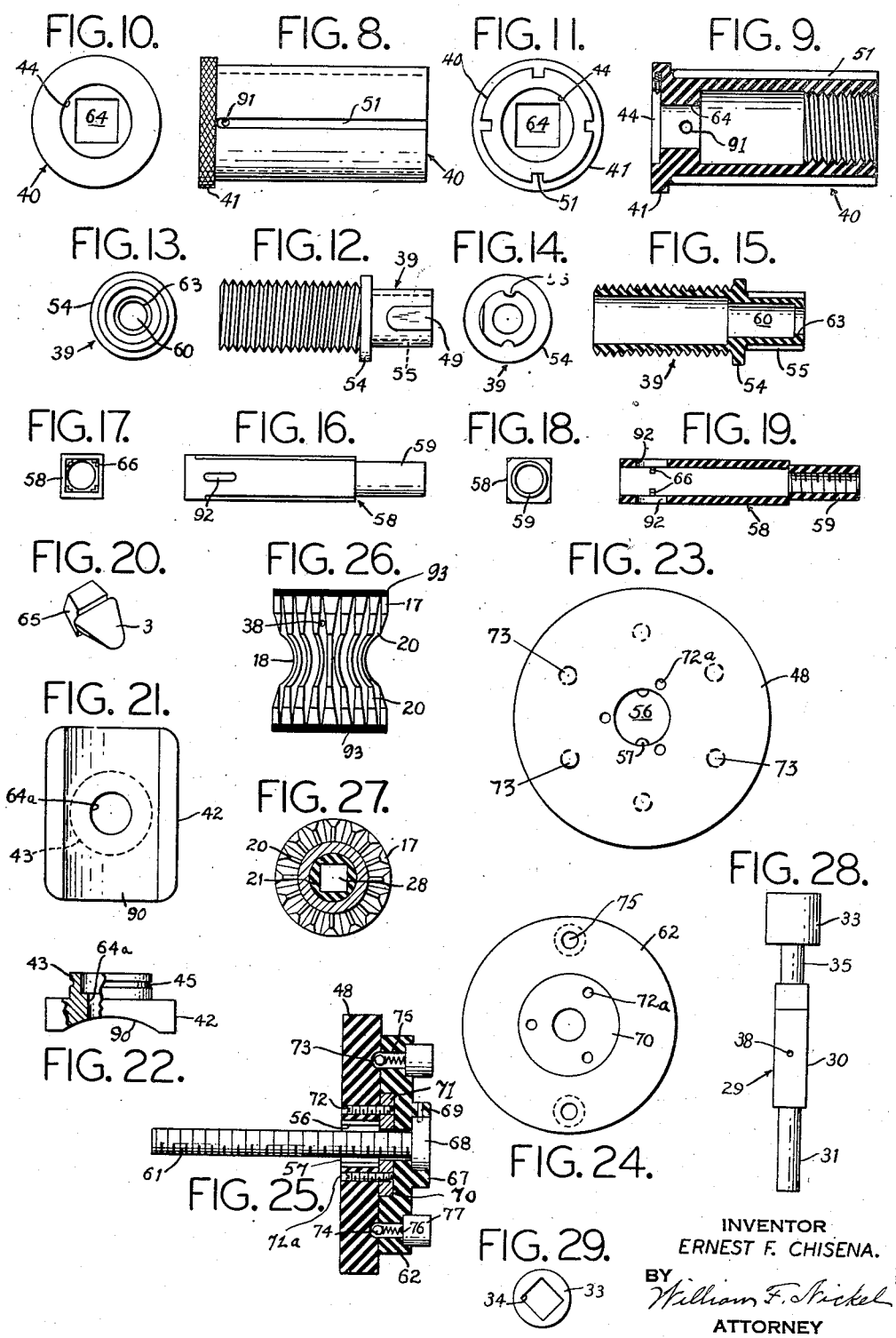
INVENTOR
ERNEST F. CHISENA.
BY
William F. Nickel
ATTORNEY April 15, 1958  E. F. CHISENA  2,830,366
CUTTING IMPLEMENTS FOR ELECTRIC CABLES
Filed Aug. 11, 1955  3 Sheets-Sheet 3
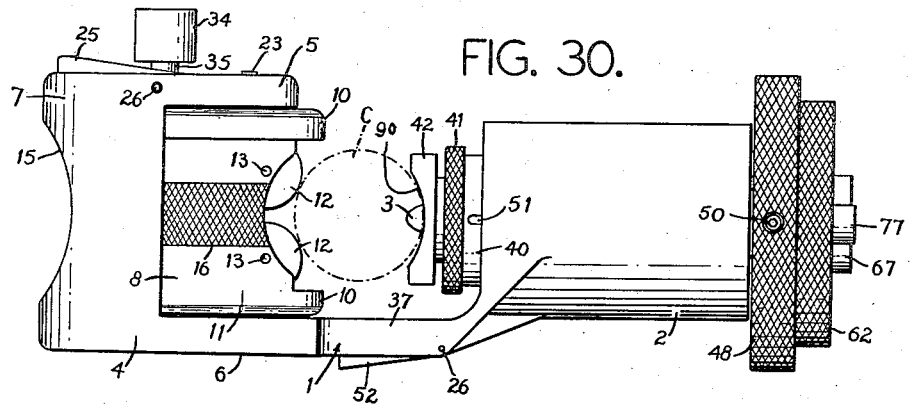
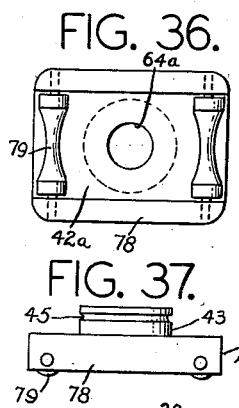
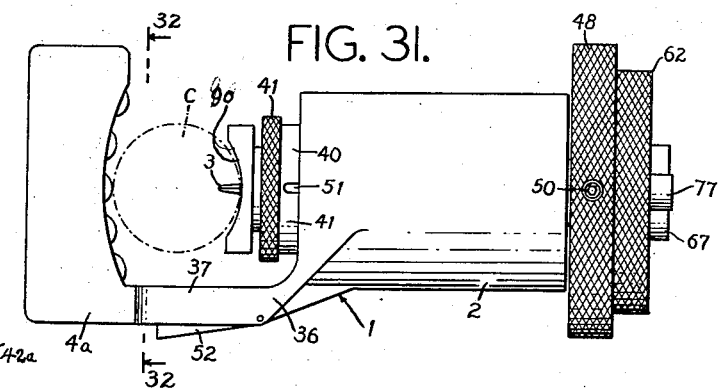
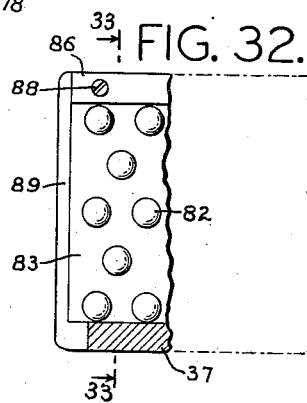
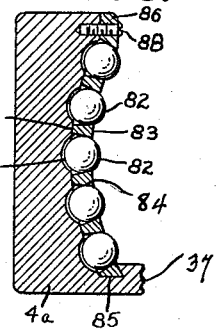
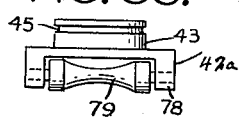
INVENTOR
ERNEST F. CHISENA.
BY *William F. Nickel*
ATTORNEY

United States Patent Office 2,830,366
Patented Apr. 15, 1958

2,830,366

CUTTING IMPLEMENTS FOR ELECTRIC CABLES

Ernest F. Chisena, Huntingdon, N. Y.

Application August 11, 1955, Serial No. 527,665

10 Claims. (Cl. 30—91)

This invention is an improvement in cutting implements, especially designed for severing the outer tubular casings or sheathing of electric cables to expose the insulated conductors inside the cable, whenever such exposure is believed to be necessary.

The principal object of my invention is to provide a unitary implement containing parts by which the casing or sheathing of an electric cable can be safely cut lengthside or around the circumference, and the cut portion then removed, so as to lay bare the conductors at any point desired when cables have to be spliced, or portions inspected, repaired or replaced.

Another object is to provide such a cutting implement or tool having means for clamping it securely to the cable in position to be effectively manipulated to slit the sheathing either longitudinally or transversely thereof.

A further object is to provide such a cutting implement with a blade that can be readily adjusted independently of the clamping parts when the cable is clamped in the implement, to divide the sheathing in the direction required.

An additional object is to provide a cutting implement with anti-friction elements, which enable the cutting to be effected without extra damage to the sheathing or other parts of the cable at the place where the cutting operation is performed.

Other objects and the nature and advantages of the invention are clearly set forth herein and the characteristics of the implement are defined in the appended claims. Two preferred embodiments of the implement are illustrated on the drawings, but changes in various minor respects may be made without deviating from the general construction in which the invention resides.

On the drawings:

Figure 8 is a side elevation, Figure 9 is a longitudinal section, Figure 10 is an end elevation, and Figure 11 is an elevation of the opposite end, of a tubular clamping sleeve which cooperates with said abutting member.

Figures 12, 13, 14 and 15 are respectively a side elevation, two opposite end views, and a longitudinal section of a hollow shaft by which the clamping sleeve is adjusted and controlled.

Figures 16, 17, 18 and 19 are respectively a top elevation, two opposite end elevations and a longitudinal section of a hollow adjustable rod for carrying the cutting blade.

Figure 20 is a perspective view of said blade.

Figures 21 and 22 are respectively front and end views of a clamping head mounted on the outer end of the clamping sleeve.

Figure 23 is an elevation of the inner face of one of a pair of knobs or disks at one extremity of the implement for operating the parts which control the clamping sleeve and the cutting blade.

Figure 24 is an elevation of the inner face of the other of said knobs.

Figure 25 is a cross section of both said knobs.

Figures 26 and 27 are respectively a side and an end elevation of a gear carried by the rotatable member shown on Figures 5, 6 and 7 for shifting the cable in the implement.

Figures 28 and 29 are respectively a side and an end elevation of a spindle for mounting and rotating said gear.

Figure 30 is a side view similar to Figure 2 of the implement with the parts in changed positions.

Figure 31 is a side elevation of another form of the implement.

Figure 32 is a section on line 32—32 of Figure 31.

Figure 33 is a section on line 33—33 of Figure 32.

Figure 34 shows a detail in section.

Figure 35 shows a catch for the rotatable member appearing separately on Figures 5, 6 and 7.

Figures 36, 37 and 38 are respectively face, top, and side views of another form of clamping head.

Figure 1:
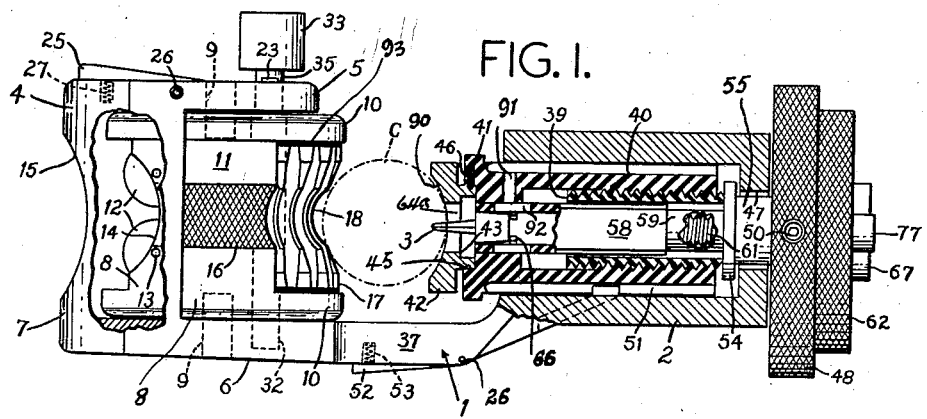
Figure 1 is a longitudinal section through a cable-cutting implement according to my invention.
Figure 2:
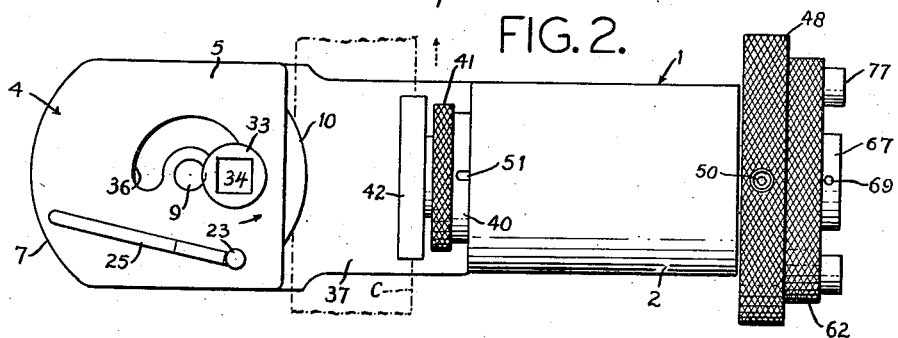
Figure 2 is a plan view thereof.
Figure 3:
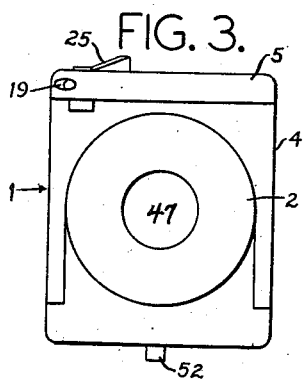
Figure 3 is an elevation of the end viewed from the right in Figure 1 of the body or framework for carrying the operating parts of the implement.
Figure 4:
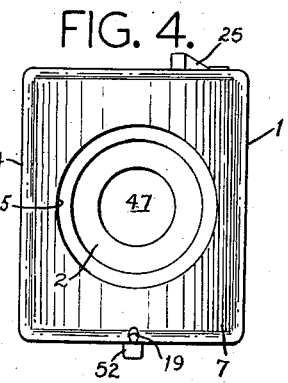
Figure 4 is an elevation of the opposite end of said framework.
Figure 5:
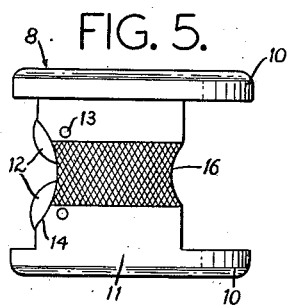
Figures 5, 6 and 7 are respectively side, top and front views of a rotatable member having elements for abutting the cable when it is clamped in the implement for cutting.
Figure 7:
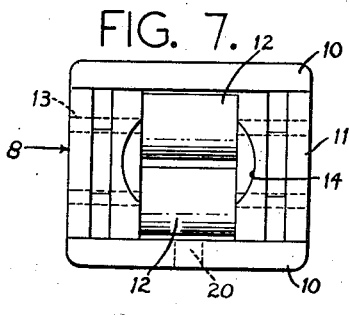
Figure 6:
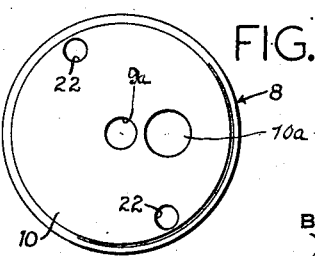

The body or framework 1 of the implement or tool is preferably a one-piece metal casting, having a section in the form of a hollow cylindrical casing 2 at one end, to carry the cutting blade 3 and the most of the other working parts; and, with the tool constructed as shown on Figures 1, 2 and 30, having a rounded hook-shaped section 4 at the other end to contain parts that cooperate in clamping the cable in place and otherwise facilitate the cutting operation. The sections 2 and 4 are of course rigid with each other. The section 4 has a top 5 and bottom 6 connected by a curved cylindrical wall 7 at the very extremity of the casting 1; and the section 4 at the end opposite the wall 7 is open and presented to the adjacent end of the casing 2. In this section 4 of the tool is a rotatable member having the form of a round barrel or cage 8 (Figures 5, 6 and 7) mounted to turn on journals 9 secured in the top 5 and bottom 6 of section 4. The axis of this head or barrel 8 is in line with the axis of the casing 2, but in transverse relation. Also the barrel has upper and lower closed ends 10 and it is closed along most of the cylindrical face 11. On the inside of the barrel 8 are two anti-friction rollers 12 in transverse position with their adjacent edges aligned with the middle of the casing 2, and mounted to turn freely on fixed pins or spindles 13 supported at their ends in the cylindrical wall 11. The wall 11 of the barrel and the wall 7 of the end section 4 have respectively openings 14 and 15 which can register when the barrel is in proper position, and the wall 11 of the barrel 5 has a milled band 16 along the middle so that it can be grasped and shifted by hand on its axis. When the openings 15 and 14 of the walls 7 and 11 register, a great part of this band 16 is exposed beyond the wall 7. On the side opposite the opening 14, the barrel is open, with the ends 10 at top and bottom projecting, and between the projecting portions of these ends is a gear 17, having a deep groove 18 between its ends, with the axis of the gear 17 parallel to the axis of the member 8. (See Figures 26 and 27.) The barrel or cage 8 can be adjusted to present either the rollers 12 or the gear 17 to the adjacent end of the casing 2. The gear 17 is mounted to turn on a shaft, to be described later, in the top 5 and bottom 6 of the section 4. The journals 9 are in openings 9a in the ends 10 of the member 8, and are secured by pins or screws 19 in threaded holes on the section 4, turned up tightly against the studs or journals 9. The gear 17 has teeth 20 extending lengthwise from end to end, and an insulating bushing 21 in a bore through it for the shaft that turns it.

The top of the barrel 8 has a pair of diametrically opposite recesses 22 and the top 5 of section 4 has a catch therein to engage one or the other of these recesses according to the desired position of the member 8. The catch comprises a stud 23 with a circumferential groove 24 fitting an opening in the top 5 of the section 4. The groove 24 receives the end of a lever 25 in a long recess in the top 5, the lever being pivoted on a pin 26, and impelled by a compression spring 27 in a recess on the body 1 under the lever, at such a point that the spring always tends to move the lever to press the stud 23 down into one of the recesses 22. This detail is fully shown in Figure 35. The member can thus be retained in either position indicated on Figures 1 and 30.

The bushing 21 extends fully through the grooved gear 17, and has a square bore 28 through it from end to end to receive a shaft 29, shown separately in Figures 28 and 29, passed into the bore 28 through openings 10a in the ends 10 of the barrel 8. The shaft has a square portion 30 fitting the bore 28 in the gear and one end 31 of this shaft is round to rotate freely in a round bearing cavity 32 in the bottom 6 of the section 4, while at the opposite end is a head 33 with a square recess 34 to receive a wrench or crank to rotate the gear 17. Between the head 33 and square section 30 the shaft 29 has a round neck 35 to move in a semi-circular groove 36 in the top 5 of the section 4, long enough to allow the gear and shaft to shift the barrel 8 and gear 17 when the barrel is to be moved to bring the rollers 12 to face the casing 2. The section 4 is connected by a neck 37 to the casing 2 in line with the bottom 6, but there is an open space between the top 5 and the casing 2 so that a cable C can be inserted between the casing 2 and barrel 8. The shaft 29 and gear 17 both have openings 38 for a pin so that the two can be rigidly connected to rotate together.

The shank or casing 2 houses a hollow shaft 39 with threads on most of its outer surface to engage inside threads at one end of a clamping sleeve 40 inside the casing 2. These parts appear on Figures 8 to 15 inclusive. The opposite end of the sleeve 40 projects from the end of the casing adjacent the barrel 8 and this opposite end of the sleeve 40 is surrounded by a milled flange 41 larger than the bore of the casing 2. Attached to this projecting end of the sleeve 40 is a rectangular head 42, which has a round central boss 43 that fits into a round recess 44 in the sleeve 40. The boss 43 has a circumferential groove 45, and a pin 46 in the flange 41 enters this groove to secure the head 42 on the sleeve 40, but allows the head to be turned. The pin is disposed in a recess with a spring under it to press it outward, and the outer end is rounded. Hence the head 42 can easily be put on and taken off; any suitable means to hold the pin in the recess can be utilized. A leaf spring in a recess at the side of the cavity 44 may also be used. The outer face of the head 42 has a shallow concave groove 90 extending fully across the clamping head 42. When a cable to be cut is pressed against the gear 17 and the head 42 and knife 3 are forced against it, a wrench or tool with a square end inserted in the recess 34 of the shaft 29 can be turned to rotate the gear and move the cable lengthwise to cause the knife to cut the sheathing. A covering of insulation or metal can easily be severed.

The end of the casing remote from the section 4 is partly closed but has a central opening 47 through which an end of the hollow shaft 39 projects, and is affixed to a circular knob or disk 48 in a central opening thereof that has a milled rim to be grasped and turned. The end of this shaft in the disk 48 has a flat surface 49 against which a screw 50 in the knob is forced to make the shaft 39 and knob 48 rigid with each other. Hence by turning the knob 48 the shaft 39 can be rotated and the member 40 and the head 42 can be moved longitudinally and clamped against the cable C that lies in the groove 18 of the gear 17. The member 40 fits the cylindrical interior of the casing 2 snugly but cannot turn therein because it has four grooves 51 running lengthwise on its outer surface, and a catch 52 in the body 1, which, when it engages any one of these grooves prevents rotation of the sleeve or member 40 but leaves it free to move lengthwise in the casing 2. The catch 52 is a lever mounted in an elongated groove in the neck 37. A spring 53 in a recess in the neck forces one end of the lever outward into exposed position and keeps the other end in one of the grooves or slots 51. Pressure of a finger on the exposed end of the lever 52 releases the sleeve 40. It can then be seized at the milled flange 41 and turned in the casing 2.

The shaft 39 has a collar 54 at the inner end of the threads thereon and beyond the collar is the flattened surface 49 engaged by the screw 50 in the disk 48. This end of the shaft 39 also has keyways 55 receiving keys 56 in the opening 57 of the disk 48 to affix the knob 48 securely on the shaft 39, in combination with the screw 50 so that the knob 48 can turn the shaft 39.

Within the hollow shaft 39 is a smaller hollow shaft 58 which has at one end a rounded portion 59 having threads therein. This portion fits into a reduced portion 60 of the bore in the tubular shaft 39 and its inside threads are engaged by a threaded rod 61 that passes out through the knob 48 and at the outer face of the knob 48 is a second knob 62 to which the rod 61 is affixed and by which the rod 61 can be turned. The reduced bore 60 lies in the end portion of the shaft 39 having the flat surface 49 and keyways 55. Except for the rounded portion 59 the shaft or rod 58 is square in cross section, and the bore of the tubular shaft 39 is large enough at all points to permit the shaft 39 to be rotated around the shaft 58. The inner terminal portion 59 of the shaft 58 cannot move out of the open end of the portion 60 of the bore of the shaft 39, because the adjacent extremity of the shaft 39 has an inside flange 63 which acts as a stop for the shaft 58, but this rim or flange 63 will permit the threaded rod 61 to turn freely therein. The square shaft 58 is long enough to project from the tubular shaft 39 into the clamping member 40, and the end of the member 40 has a square opening 64 into which the square part of the shaft 58 projects, so that when the member 40 is rotated the shaft 58 turns with it. The head 42 also has an opening 64a in line with the opening 64; and the blade 3 is affixed to a tapering block 65 which can be inserted through the openings 64a and 64 and seated in the hollow shaft 58. In the shaft 58 are projections 66 which act as stops to limit the inward movement of the block 65. The rod 61 projects into a boss 67 on the outer face of the knob 62 and its head 68 is held rigid therewith by a screw 69.

When the parts of the implement are all assembled the flange 54 on the shaft 39 lies adjacent the inner end of the casing 2, and a suitable washer will be put between this flange and the edges of the opening 47. The shaft 39 is held against longitudinal movement by the flange 54 in the casing 2 and the outside knob 48.

The knob 62 has a central recess 70 on its inner face seating a ring 71 which is fixed to the knob 48 by screws 72, but about which the knob 62 can be turned. The knob 48 has recesses 73 on its face adjacent the knob 62 all round its circumference, and the knob 62 has balls 74 in bores 75, backed by springs 76, the bores being closed by plugs 77 in the knob 62. The knob 62 can be turned easily to move each ball 74 from one recess 73 to another while the knob 48 remains stationary. Screws 72 enter holes 72a in the ring 71 and knob 48.

Figures 36, 37 and 38 show a clamping head 42a of a different type to be attached to the sleeve 40. It has flanges 78 along opposite edges and between the flanges rollers 79 are mounted at each side. The rollers are thick on the ends and taper towards the middle of their lengths and have pins or trunnions at their ends by which they are rotatably connected to the flanges 78. The knife 3 projects through the central opening 64a. The rollers 79 permit the cutter to move easily along the length of the cable, or around it when a circular cut is to be made in the outside sheathing.

The slots 51 in the clamping sleeve 40 are so located with respect to the part of the bore in the sleeve 40 that has the square opening 64 and receives the square shaft 58 holding the blade 3 at the end surrounded by the flange 41, that a plane joining any two diametrically opposite slots 51 passes through the middle of the shaft 58 and is perpendicular to the flat opposite faces of the shaft 58 which are intersected by said plane. Since the plug 65 to which the blade 3 is affixed is square and tapered for a snug fit in the square bore at the adjacent end of the hollow shaft 58, the blade 3 can be adjusted and held parallel to the flat neck 37 connecting the sections 2 and 3, in position to make a cut along the length of the cable. See Figure 1. With the plug in the outer end of the rod or shaft 58, the sleeve 40 can also be turned when necessary, to dispose the blade 3 so that its general plane is perpendicular to the neck 37. See Figure 30. This can be done by releasing the catch 52 and then grasping the flange 41 and rotating the sleeve 40 and square shaft 58 together by hand through an arc of 90 degrees. The catch 52 is then released to hold the sleeve 40 against rotation by engaging the slot 50 nearest to the neck 37.

For a longitudinal cut of the necessary depth in the cable, the blade 3 is adjusted in the sleeve 40 accordingly by holding the knob 48 and turning the outer knob 62, which is rotatable on the ring 71, so that the threaded bolt or rod 61 moves the square hollow shaft 58 in the sleeve 40. This sleeve 40 and blade 3 are then drawn back a little by turning the knob 48, letting the knob 62 turn with it.

The cable C is then inserted between the sleeve 2 and section 4, the head 8 being first adjusted so that it presents the gear 17 to the cable, with the catch 25 in the top 5 of section 4 holding the head 8 as required. The cable C thus seats in the groove 18 of the gear 17, the head 42 is turned so that the groove 90 is parallel to the cable, and the knob 48 is grasped by hand and turned to force the head 42 against the cable. The turning of the knob 48 of course rotates the hollow shaft 39 and carries the knob 62 around with it to rotate the bolt 61, and the sleeve 40 and head 42 are impelled towards the cable C, to clamp it against the cable C; and the knife 3 at the same time is forced into the sheathing of the cable. Then by means of a crank or wrench in the recess 34 of the head 33 on the shaft 29, the gear 17 is rotated and a cut made as long as desired. If the head 42a is used, the rollers 79 will be disposed transversely to the cable C.

The pitch of the threads on the hollow rod or shaft 39 and on the rod or bolt 61 is the same and the threads on both describe a spiral in the same direction. So long as the knob 62 is not held motionless by hand the turning of the knob 48 carries with it the other knob 62 and the rod 61 in mesh with the part 59 of the shaft 58, and causes the square shaft or rod 58 to move longitudinally with the sleeve 40. When the knob 48 is held and kept from rotating, the head 62 can be independently rotated because it will slip on the head 48 due to the balls 74 and springs 76 in the head 62 and the recesses 73 in the head. Hence the rod 61 can be turned to move the square rod 58 in the sleeve 40 and force the blade 3 in operating position.

For a cut around the cable, the knobs 48 and 62 are manipulated as before to adjust the blade 3 in the sleeve 40 and the sleeve 40 and knife are again withdrawn slightly. Also the catch 25 in the top 5 in the section 3 is pressed to release the head 8, and by means of the knob 33, or by gripping the head by hand at the milled band 16, the head 8 is shifted to bring the rollers 12 to face the shank 2. The head 8 is now locked in this position by the catch 25. The catch 52 in the neck 37 is again manipulated to release the sleeve 40, which is grasped at the flange 41 and turned through an arc of 90 degrees to present the knife 3 edgewise to the neck, relocked by the catch 52 in another slot 51, and the head 42 or 42a is again clamped against the cable and the blade 3 forced into the sheathing. The cutting implement is now swung around the cable, the operator holding the shank 2 as a handle till the cut is completed. The rollers 12 lie transversely of the axis of the gear 17.

The sleeve 40 has a hole 91 through it in the bottom of one slot 51 adjacent the flange 41, and this hole is in line with slots 92 in the sides of the square shaft 58 behind the plug 65 of the blade 3. The blade can be freed from the square shaft by inserting a pin in the hole 91 and slots 92. When the square shaft 58 is backed into the shank 2, by turning the knob 62 and holding the knob 47 fast, the aforesaid pin pushed the plug 65 and knife 3 out of the shaft. The slots 92 in the shaft 58 are exposed in the sleeve 40 to the extent required.

In Figures 32, 33 and 34 the implement has a section 4a opposite the shank or casing 2 without the barrel or head 8. This section presents a concave face 80 to the casing 2, and this face has recesses 81 for anti-friction balls 82. The balls are retained by a curved lattice 83 having recesses 84 smaller than the balls but large enough to permit the balls to project. One end of the lattice fits into a groove 85 in the neck 37 and the opposite end has a flange 86 with openings 87 for screws 88 engaging the section 4a. The concave face is countersunk with ribs 89 at each side flush with the outer face of the lattice 83. The cutting implement should preferably be finished by giving it a coating of plastic insulation which will adhere to the outer surface and is durable enough to resist wear and handling in practice.

The sleeve 40, the hollow shaft 39 and the hollow square rod 58, together with the knobs 49 and 62, as well as the washers 93 at the end of the gear 17, are all made of tough insulating material and other parts of the implement may also be made of insulating material to minimize the risk of shock.

Also the hollow square rod 58 may have the slots 92 on all four sides to enable the blade 3 to be moved in any position of the sleeve 40 when one of the slots 51 is engaged by the catch 52.

Having described my invention what I believe to be new is:

1. An implement for cutting the outer covering of an electric cable, said implement having a body with end sections and a space between them to receive a cable, a head rotatably mounted on one section, said head having an opening at one side, a pair of parallel rollers mounted in said head with portions exposed at said opening, the opposite side of the head being open, a grooved gear rotatably mounted in the head at said opposite side with its axis at right angles to the axes of the rollers, a shaft in the head to be engaged by a tool to rotate the gear, the other section having a knife blade adjacent said space and means in said other section for turning said blade into position parallel to said rollers or at right angles thereto and for projecting said knife blade into engagement with said covering.

2. An implement for cutting the outer covering of an electric cable, said implement having a body with end sections and a space between them to receive a cable, a head rotatably mounted on one section, said head having an opening at one side, a pair of parallel rollers mounted in said head with portions exposed at said opening, the opposite side of the head being open, a grooved gear rotatably mounted in the head at said opposite side with its axis at right angles to the axes of the rollers, a shaft in the head to be engaged by a tool to rotate the gear, the other section having a knife blade adjacent said space and means in said other section for turning said blade into position parallel to said rollers or at right angles thereto and for projecting said knife blade into engagement with said covering, said means comprising a sleeve in said other section slidably and rotatably disposed in said other section but normally held against rotation, the knife blade being slidably and non-rotatably mounted in said sleeve.

3. An implement for cutting the outer covering of an electric cable, said implement having a rotatable head at one end, a pair of parallel rollers mounted on said member, a gear on said member, with its axis at right angles to the rollers, said gear and rollers being exposed at the sides of said member, a casing at the opposite end of the implement in line with said member but separated at its adjacent inner end therefrom by a space to receive a cable, a knife blade mounted in the casing projecting towards the head, means for actuating the blade towards said space to engage the cable, means for rotatably adjusting the blade to cooperate with the rollers or the gear, as either engages the cable, and knobs at the outer end of the casing to operate each of said means.

4. An implement for cutting the outer covering of an electric cable, comprising a body having end sections, a neck rigidly connecting said sections, the body having a space to receive a cable between the sections adjacent the neck, means in one section for making anti-frictional contact with the cable, a cutter blade in the other section, clamping means in the other section, and means carried by the other section for actuating the blade and the clamping means to engage the cable, said clamping means being slidably mounted in the other section and rotatably adjustable therein, and enveloping the blade, the actuating means comprising a hollow rod carrying said knife blade, said rod being slidably and non-rotatably mounted in said clamping means, and a releasable catch on the body for engaging said sleeve.

5. The implement according to claim 4 in which the said means for making anti-frictional contact with the cable comprises rotatably mounted spherical elements in said one section.

6. An implement for cutting the outer covering of an electric cable, comprising a body having end sections, a neck rigidly connecting said sections, the body having a space to receive a cable between the sections adjacent the neck, means in one section for making anti-frictional contact with the cable, a cutter blade in the other section, clamping means in the other section, and means carried by the other section for actuating the blade and the clamping means to engage the cable, said actuating means comprising detachably connected knobs on the outer end of the other section, said clamping means being rotatably adjustable, and a releasable catch on the body for engaging said clamping means.

7. An implement for cutting the outer covering of an electric cable, comprising a body having end sections, a neck connecting said sections, the body having a space between the sections adjacent the neck for receiving a cable, one of said sections having means for making anti-frictional contact with said cable, a knife blade, a rod having a bore in one end of which the blade is non-rotatably mounted, a clamping sleeve enveloping the rod, said sleeve having an opening for said end of said rod adjacent said space of such shape that the rod is non-rotatable in the sleeve, a threaded bolt engaging internal threads in said rod, a hollow shaft having threaded engagement with the sleeve, said shaft, sleeve, rod and bolt being encased in the other section, and the sleeve being slidable and rotatably adjustable therein, the hollow shaft and threaded bolt projecting from the outer extremity of said other section, a knob outside said extremity secured to the shaft, a knob secured to said bolt, and means carried by said knobs for detachably connecting one to the other.

8. An implement for cutting the outer covering of an electric cable, comprising a body having end sections, a neck connecting said sections, the body having a space between the sections adjacent the neck for receiving a cable, one of said sections having means for making anti-frictional contact with said cable, a knife blade, a rod having a bore in one end of which the blade is non-rotatably mounted, a clamping sleeve enveloping the rod, said sleeve having an opening for said end of said rod adjacent said space of such shape that the rod is non-rotatable in the sleeve, a threaded bolt engaging internal threads in said rod, a hollow shaft having threaded engagement with the sleeve, said shaft, sleeve, rod and bolt being encased in the other section, and the sleeve being slidable and rotatably adjustable therein, the shaft and threaded bolt projecting from the outer extremity of said other section, a knob outside said extremity secured to the shaft, a knob secured to said bolt and means carried by said knobs for detachably connecting one to the other, said first-named means including a rotatably mounted head in said one section adjacent said space, a pair of exposed rollers mounted in said head, a gear having a central groove carried by said head spaced from said rollers, the axes of the rollers being transverse to the axis of said gear, and means for turning said gear.

9. An implement for cutting the outer covering of an electric cable, comprising a body having end sections, a neck connecting said sections, the body having a space between the sections adjacent the neck for receiving a cable, one of said sections having means for making anti-frictional contact with said cable, a knife blade, a rod having a bore in one end of which the blade is non-rotatably mounted, a clamping sleeve enveloping the rod, said sleeve having an opening for said end of said rod adjacent said space of such shape that the rod is non-rotatable in the sleeve, a threaded bolt engaging internal threads in said rod, a hollow shaft having threaded engagement with the sleeve, said shaft, sleeve, rod and bolt being encased in the other section, and the sleeve being slidable and rotatably adjustable therein, the shaft and threaded bolt projecting from the outer extremity of said other section, a knob outside said extremity secured to the shaft, a knob secured to said bolt and means carried by said knobs for detachably connecting one to the other, said first-named means including a rotatably mounted head in said one section adjacent said space, a pair of exposed rollers mounted in said head, a gear having a central groove carried by said head spaced from said rollers, the axes of the rollers being transverse to the axis of said gear, and means for turning said gear, said one section having a catch to hold said head with either the rollers or the gear engaging said cable.

10. An implement for cutting the outer covering of an electric cable, comprising a body having end sections, a neck connecting said sections, the body having a space between the sections adjacent the neck for receiving a cable, one of said sections having means for making anti-frictional contact with said cable, a knife blade, a rod having a bore in one end of which the blade is non-rotatably mounted, a clamping sleeve enveloping the rod, said sleeve having an opening for said end of said rod adjacent said space of such shape that the rod is non-rotatable in the sleeve, a threaded bolt engaging internal threads in said rod, a hollow shaft having threaded engagement with the sleeve, said shaft, sleeve, rod and bolt being encased in the other section, and the sleeve being slidable and rotatably adjustable therein, the shaft and threaded bolt projecting from the outer extremity of said other section, a knob outside said extremity secured to the shaft, a knob secured to said bolt, and means carried by said knobs for detachably connecting one to the other, said sleeve having longitudinal grooves in its outer face, and a catch in said body for engaging one of said grooves to hold the sleeve with the knife blade in adjusted position.

References Cited in the file of this patent

UNITED STATES PATENTS

| | | |
|---|---|---|
| 402,730 | Foerster | May 7, 1889 |
| 1,866,095 | Foley | July 5, 1932 |
| 2,064,661 | Hammond | Dec. 15, 1936 |
| 2,437,514 | Givens | Mar. 9, 1948 |
| 2,538,453 | Harkins | Jan. 16, 1951 |
| 2,647,309 | Chisena | Aug. 4, 1953 |
| 2,649,654 | Carta | Aug. 25, 1953 |

FOREIGN PATENTS

| | | |
|---|---|---|
| 740 | Germany | Aug. 5, 1877 |